United States Patent
Lee et al.

(10) Patent No.: US 7,961,710 B2
(45) Date of Patent: Jun. 14, 2011

(54) APPARATUS AND METHOD FOR SETTING MULTI-PATH

(75) Inventors: Ji-Hoon Lee, Cheongju-si (KR); Xuhui Hu, New York, NY (US); Yong Liu, New York, NY (US); Myung-Jong Lee, New York, NY (US)

(73) Assignees: Samsung Electronics Co., Ltd., Suwon-si (KR); The Research Foundation of the City University of New York, New York, NY (US)

( * ) Notice: Subject to any disclaimer, the term of this patent is extended or adjusted under 35 U.S.C. 154(b) by 713 days.

(21) Appl. No.: 11/674,351

(22) Filed: Feb. 13, 2007

(65) Prior Publication Data

US 2007/0201427 A1 Aug. 30, 2007

Related U.S. Application Data

(60) Provisional application No. 60/772,562, filed on Feb. 13, 2006.

(30) Foreign Application Priority Data

Jul. 20, 2006 (KR) .................. 10-2006-0068032

(51) Int. Cl.
*H04L 12/28* (2006.01)
(52) U.S. Cl. ........ 370/351; 370/338; 370/432; 379/219; 379/221.01
(58) Field of Classification Search ............... None
See application file for complete search history.

(56) References Cited

U.S. PATENT DOCUMENTS

| | | | |
|---|---|---|---|
| 6,205,481 B1* | 3/2001 | Heddaya et al. | 709/226 |
| 6,526,044 B1* | 2/2003 | Cookmeyer et al. | 370/352 |
| 2002/0003804 A1* | 1/2002 | Hjalmtysson et al. | 370/410 |
| 2002/0161917 A1* | 10/2002 | Shapiro et al. | 709/238 |
| 2003/0123429 A1* | 7/2003 | Hirota et al. | 370/351 |
| 2003/0212821 A1* | 11/2003 | Gillies et al. | 709/238 |
| 2004/0001497 A1* | 1/2004 | Sharma | 370/401 |
| 2004/0064581 A1* | 4/2004 | Shitama et al. | 709/238 |
| 2004/0156384 A1* | 8/2004 | Rune et al. | 370/432 |
| 2004/0174884 A1* | 9/2004 | Wright | 370/395.41 |
| 2004/0243905 A1* | 12/2004 | Merritt | 714/758 |
| 2004/0264675 A1* | 12/2004 | Delaney et al. | 379/229 |
| 2005/0089016 A1* | 4/2005 | Zhang et al. | 370/351 |
| 2005/0099983 A1* | 5/2005 | Nakamura et al. | 370/338 |
| 2005/0180447 A1* | 8/2005 | Lim et al. | 370/432 |
| 2005/0240796 A1* | 10/2005 | Dziong et al. | 714/2 |
| 2006/0098662 A1* | 5/2006 | Gupta et al. | 370/401 |
| 2006/0245374 A1* | 11/2006 | Patel et al. | 370/254 |
| 2007/0165581 A1* | 7/2007 | Mehta et al. | 370/338 |
| 2007/0177506 A1* | 8/2007 | Singer et al. | 370/235 |

* cited by examiner

*Primary Examiner* — Hong Cho
*Assistant Examiner* — Ajay P Cattungal
(74) *Attorney, Agent, or Firm* — NSIP Law (57) ABSTRACT

A method and apparatus is provided for setting multiple paths between wireless nodes of an ad-hoc network including a source node, a relay node and a destination node that receives a message from the source node via the relay node. The multi-path setting method and apparatus includes receiving previous hop address information, and determining whether a wireless node that receives the previous hop address information is included in an insulating region, based on the previous hop address information.

16 Claims, 6 Drawing Sheets

APPARATUS AND METHOD FOR SETTING MULTI-PATH

CROSS-REFERENCE TO RELATED PATENT APPLICATION

This application claims the benefit under 35 U.S.C. §119(e) of a U.S. Patent Application No. 60/772,562, filed on Feb. 13, 2006 in the United States Patent and Trademark Office, and claims the benefit under 35 U.S.C. §119(a) of Korean Patent Application No. 2006-68032, filed on Jul. 20, 2006 in the Korean Intellectual Property Office, the entire disclosures of both applications is hereby incorporated by reference.

BACKGROUND OF THE INVENTION

1. Field of the Invention

The present invention relates to an apparatus and method for setting multi-paths. More particularly, the present invention relates to an apparatus and method for setting multi-paths by taking previous hop address information into account.

2. Description of the Related Art

The development of the Internet and mobile communication technologies allowed users to enjoy various multimedia services regardless of time and space, causing a noticeable change in their everyday life. Particularly, with the recent increasing spread of small-sized portable electronic devices such as notebook PCs and PDAs, there are increasing attempts to implement the Internet-based data communication not only through wire networks but also through wireless networks.

Traditionally, an inter-path interference may occur when a multi-path is set amongst nodes of a network. The typical wireless network can include an ad-hoc network. An ad-hoc network is characterized in that it has no centralized management apparatus and it does not use the existing communication-based configuration and does not have fixed control apparatuses (router, host, wireless base station, and the like) for providing connection between mobile nodes. That is, according to the ad-hoc network, a mobile node itself serves as a router. Therefore, when a specific mobile node desires to perform communication with a correspondent node, the mobile node should establish a communication path through several nodes located between the mobile node and the correspondent node.

An exemplary implementation of an ad-hoc network can include a sensor network composed of a plurality of sensors. Because the development of low-price, low-power and multifunction sensor nodes is possible due to the recent development of wireless communication technology, it is possible to perform sensing, data processing and communication operations by implementing the sensor network composed of the small-sized sensor nodes. That is, the sensor network is composed of many densely distributed sensor nodes. In order to collect and deliver desired information through the many sensor nodes, a routing protocol between sensor nodes composed of only the wireless interfaces needs to be implemented. In addition, the routing protocol should be able to appropriately cope with the phenomena occurring due to the free movement of the sensor nodes.

Accordingly, there is a need for an improved apparatus and method for setting a multi-path, which can reduce inter-path interferences.

SUMMARY OF THE INVENTION

Exemplary embodiments of the present invention address at least the above problems and/or disadvantages and provide at least the advantages described below. Accordingly, an aspect of exemplary embodiments of the present invention is to provide an improved method and apparatus for setting multi-paths capable of reducing and/or cancelling interference between multiple paths that take a previous hop address into account in an ad-hoc network.

Another aspect of exemplary embodiments of the present invention is to provide a method and apparatus for setting multi-paths capable of preventing reactive path settings during multi-path settings.

Another aspect of exemplary embodiments of the present invention is to provide a method and apparatus for setting multi-path for efficiently transmitting data based on priority.

Another aspect of exemplary embodiments of the present invention provides a method for setting multiple paths between wireless nodes including a source node, a relay node and a destination node that receives a message from the source node via the relay node. This exemplary aspect of setting a multi-path includes a method for receiving previous hop address information and determining whether a wireless node that receives the previous hop address information is included in an insulating region, based on the previous hop address information.

Preferably, the insulating region is a region where no path other than a primary path is established. Determining the insulating region may include determining whether a previous hop address in the previous hop address information is identical to a node address of the wireless node that receives the previous hop address information and setting the wireless node that receives the previous hop address information as a wireless node in the insulating region, if the previous hop address is not identical to the node address.

Preferably, setting the wireless node may include deleting node information corresponding to the previous hop address from a path table, if the previous hop address is not identical to the node address and transmitting a region protection packet. The region protection packet can be used for deleting information on a node that transmitted the region protection packet from a path table in a node that receives the region protection packet.

Preferably, the previous hop address information may be included in a route reply packet. Exemplary embodiments of a method for setting multi-path may further include determining whether a reactive path occurs depending on hop count information in the route reply packet, if the wireless node that receives the previous hop address information is not included in the insulating region and transmitting a correction reply packet to a node that transmitted the route reply packet, if a reactive path occurs.

Preferably, the reactive path determination may include determining that a reactive path has occurred if the hop count in the route reply packet is greater by at least two hops than a predetermined hop count from the destination node, if the wireless node that receives the previous hop address information is not included in the insulating region.

Preferably, the method for setting multi-paths may further include receiving a higher priority allocated from the destination node if it is determined that the corresponding node is not included in the insulating region and if a corresponding node that receives the previous hop address information is an immediately previous node of the destination node, receiving a higher priority allocated from the destination node as it is determined that the corresponding node is not included in the insulating region and receiving a lower priority allocated from the destination node if it is determined that the corresponding node is included in the insulating region. The priority is allocated for reception of a packet from the destination node.

Preferably, the method for setting multi-paths may further include receiving a top priority status among the higher priorities from the destination node, if the corresponding node is a node in the primary path.

Another aspect of exemplary embodiments of the present invention provides an apparatus for setting multi-paths applied to a system that may include a source node, a relay node and a destination node that receives a message from the source node via the relay node. Exemplary embodiments of the apparatus for setting multi-paths may include a receiver for receiving previous hop address information and a controller for determining whether a node of the multipath setting apparatus is included in an insulating region, based on the previous hop address information. The insulating region may be a region where no path other than a primary path is established. Preferably, the controller can determine whether a previous hop address in the previous hop address information is identical to a node address of the apparatus and can set the node of the apparatus to a wireless node in the insulating region, if the previous hop address is not identical to the node address.

Preferably, an apparatus for setting multi-paths may further include a storage unit for storing a path table and a transmitter for transmitting a region protection packet received from the controller. If the previous hop address is not identical to the node address, the controller may delete the node information corresponding to the previous hop address from the path table and generates the region protection packet. The region protection packet can be used for deleting information on a node that transmitted the region protection packet from a path table in a node that receives the region protection packet. The previous hop address information is included in a route reply packet. If the node of the apparatus is not included in the insulating region, the controller may determine whether a reactive path occur has occurred depending on hop count information in the route reply packet and generates a correction reply packet if the reactive path occurs. The transmitter transmits the correction reply packet received from the controller to a node that transmitted the route reply packet. If the node of the apparatus is not included in the insulating region, the controller may determine that a reactive path has occurred if the hop count in the route reply packet is greater by at least two hops than a predetermined hop count from the destination node. If the node of the apparatus is an immediately previous node of the destination node, the controller, depending on information received from the destination node through the receiver, may set a higher priority for the node of the multipath setting apparatus if it is determined that the node of the multipath setting apparatus is not included in the insulating region and may set a lower priority for the node of the multipath setting apparatus if it is determined that the node of the apparatus is included in the insulating region. The priority is allocated for reception of a packet from the destination node. The controller can set a top priority among the higher priorities for the node of the apparatus if the node of the apparatus is a node in the primary path.

Other objects, advantages and salient features of the invention will become apparent to those skilled in the art from the following detailed description, which, taken in conjunction with annexed drawings, discloses exemplary embodiments of the invention.

BRIEF DESCRIPTION OF THE DRAWINGS

The above and other exemplary features and advantages of certain exemplary embodiments of the present invention will become more apparent from the following detailed description of certain exemplary embodiments thereof when taken in conjunction with the accompanying drawings, in which.

Throughout the drawings, like reference numerals will be understood to refer to like elements, features and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Also, descriptions of well-known functions and constructions are omitted for clarity and conciseness.

Figure 1:
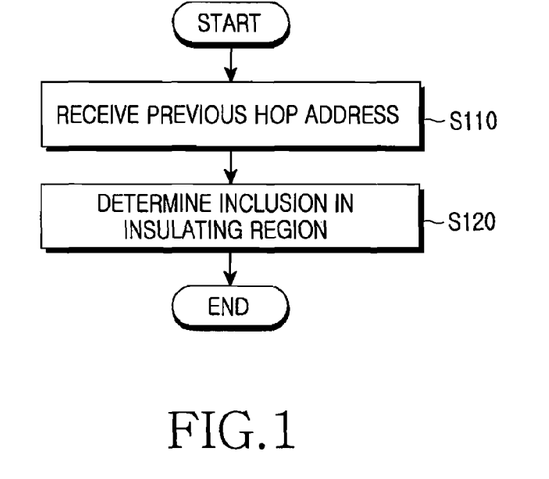
FIG. 1 is a flowchart illustrating a method for setting a multi-path according to an exemplary embodiment of the present invention.

FIG. 1 is a flowchart illustrating setting a primary path between a source node and destination node corresponding to one example of a method for setting multi-path according to an exemplary embodiment of the present invention.

Figure 6:
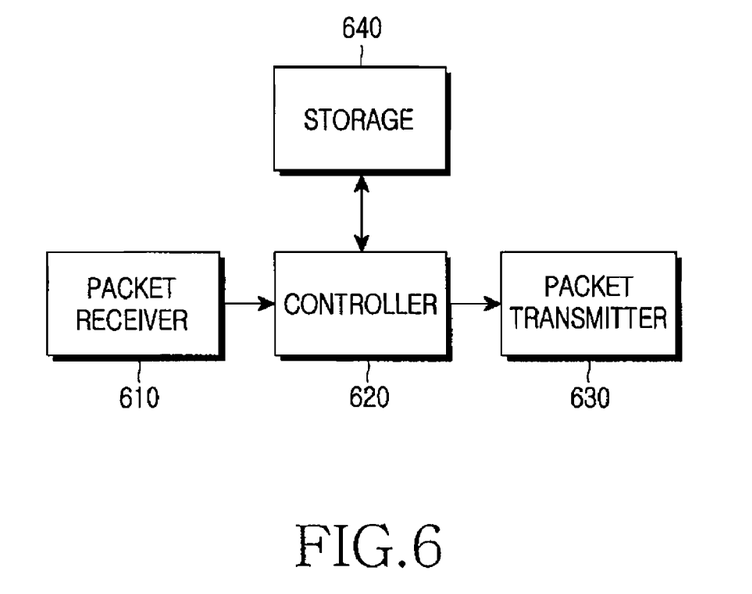
FIG. 6 is a block diagram illustrating an apparatus for setting multi-path according to an exemplary embodiment of the present invention.

FIG. 6 is a block diagram illustrating an apparatus for setting multi-path according to exemplary embodiments of the present invention. An exemplary apparatus comprises a packet receiver, 610, a controller, 620, a packet transmitter, 630 and a storage unit, 640.

In an exemplary embodiment, among wireless nodes, a source node, desiring to deliver information to a destination node, can deliver the information through other nodes located therebetween, if direct delivery is impossible due to the long distance between the nodes. That is, the source node establishes a path through nodes located therein and transmits the information through the path. The path establishment is achieved by exchanging a Route Request (RREQ) packet and a Route Reply (RREP) packet. That is, if the source node transmits a route request packet to a neighbor node that can be a replay node, the neighbor node records, as an upper node, the source node that transmitted the route request packet and then transmits the transmitted route request packet to other neighbor nodes. As the route request packet has an identifier (ID) of its destination node recorded therein, each of relay nodes receiving the route request packet determines whether the relay node itself is a destination node of the route request packet. If the relay node is not a destination node, it transmits the route request packet to the next hop node. However, if the relay node is a destination node, it selects an optimal path by analyzing information on the relay node recorded in the received route request packet, and then transmits a route reply packet in that direction. In this case, the destination node transmits the route reply packet toward the upper router that transmitted the route request packet received through the minimum number of relay nodes. If the source node receives the route reply packet in this manner, the primary path is established between the source node and the destination node. As the primary path is established, a wireless node receives a route reply packet including previous hop address information from its preceding node on the primary path through a packet receiver, 610 (S110). In this case, if the preceding node on the primary path is a destination node, the route reply packet can be received on a unicast basis and if the preceding node on the primary path is not a destination node, the route reply packet can be received, preferably, on a broadcast basis. The previous hop address information can be included, preferably, in the route reply packet.

Thereafter, a controller, 620, of the wireless node determines whether its own node is included in an insulating region based on previous hop address information in the route reply packet received through the packet receiver, 610 (S120). The insulating region can indicate the region where no path other than the primary path is established.

Figure 2:
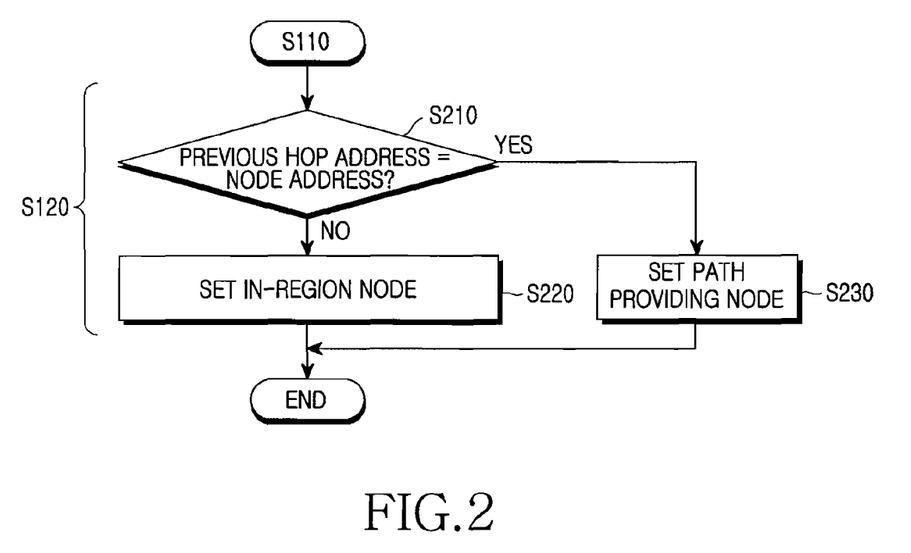
FIG. 2 is a flowchart illustrating the determining process of the method for setting multi-path of FIG. 1.

FIG. 2 is a flowchart illustrating a detailed operation of the determination process in the method for setting a multi-path of FIG. 1.

The controller, 620, of the wireless node can determine whether a previous hop address included in the route reply packet received through the packet receiver, 610, is identical to its own node address (S210). If the previous hop address included in the route reply packet is not identical to its own node address, the controller, 620, of the wireless node can set its own node as an node in the insulating region (hereinafter referred to as an "in-region node") (S220). However, if the previous hop address included in the route reply packet is identical to its own node address, the controller, 620, can recognize its own node as a node that provides a path thereto (hereinafter referred to as a "path providing node") (S230).

Figure 3:
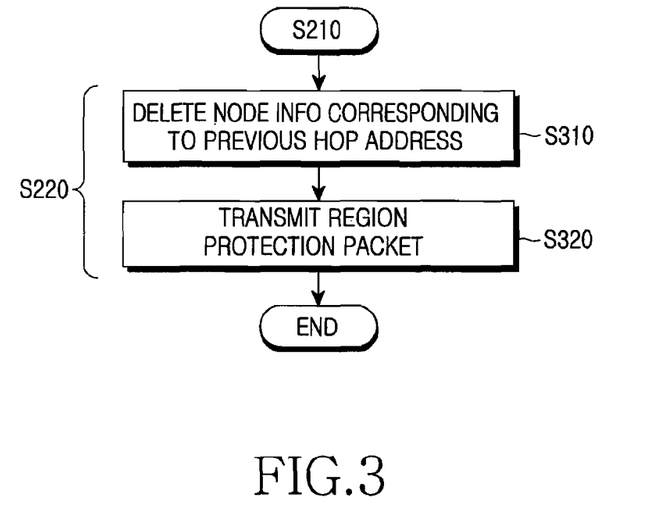
FIG. 3 is a flowchart illustrating a method for setting a multi-path method of FIG. 2.

FIG. 3 is a flowchart illustrating a method for setting, S220, in the multipath setting method of FIG. 2. In FIG. 2, S210, if the previous hop address included in the route reply packet is not identical to its own node address, the controller, 620, of the wireless node can delete information related to a node corresponding to the previous hop address from a path table (S310). However, if the previous hop address included in the route reply packet is identical to its own node address, the controller, 620, of the wireless node can recognize its own node as a path providing node (S230).

In exemplary embodiments, a path table can include a RREQ sequence number, an address of a RREQ originator (or source node) and an address of an immediate RREQ sender (or relay node). The RREQ Sequence number is a field used for determining whether an RREQ message is a previously generated one or a newly generated one. The RREQ message transmitted for path discovery starts with a specific sequence number for every source node, and all RREQ messages generated thereafter are transmitted with a sequence number increased by one. The controller, 620, can determine from the sequence number whether the path discovery attempt has previously been being made or is now newly made. In addition, if the previous hop address included in the route reply packet is not identical to its own node address, the controller, 620, of the wireless node can generate a Region protection (RPRT) packet and transmit the generated region protection packet through a packet transmitter, 630 (S320). Other nodes receiving the region protection packet can delete information on the node that transmitted the region protection packet, from the path table in the node from which they have received the region protection packet.

Figure 4:
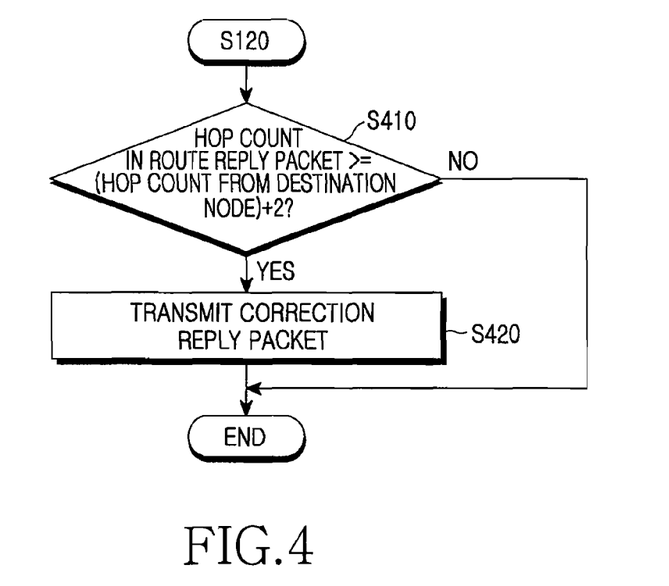
FIG. 4 is a flowchart illustrating a method for setting a multi-path according to an exemplary embodiment of the present invention.

FIG. 4 is a flowchart illustrating a method for setting multi-path according to an exemplary embodiment of the present invention. For example, if the controller, 620, of the wireless node determines that its own node is not included in the insulating region, the controller, 620, can determine whether a corresponding path is a reactive path depending on the hop count information (information on the number of hops) in the route reply packet (Step S410). In exemplary embodiments, the term "reactive path" can de described as an occurrence of a twisted path among the paths other than the primary path.

Figure 8:
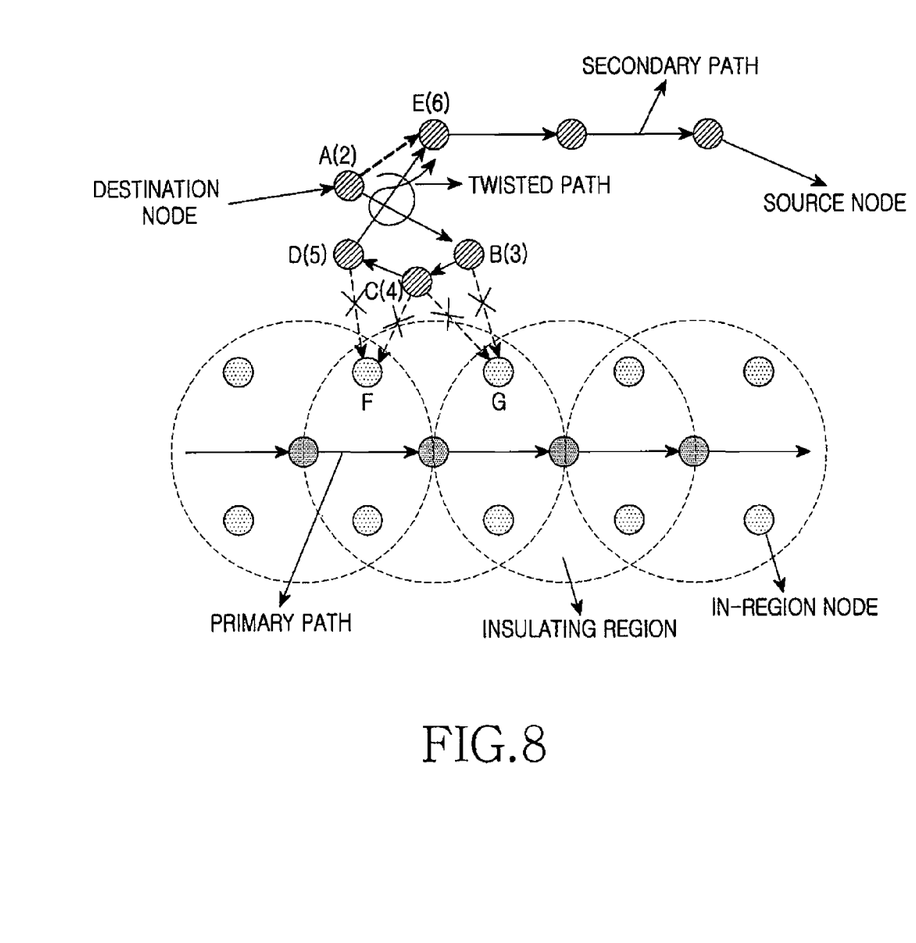
FIG. 8 is a diagram illustrating a twisted path formed in a method for setting a multi-path according to an exemplary embodiment of the present invention.

FIG. 8 is a diagram illustrating a twisted path formed in an exemplary embodiment of a method for setting a multi-path according to an exemplary embodiment of the present invention. Specifically, FIG. 8 shows a first node, A, having 2 hops from a destination node and it is preferable for the first node A to form the path to a fifth node E, but it can send a route reply packet to a second node B (In the exemplary embodiment of FIG. 8, numerals in the parentheses refer the number of hops from the destination node indicated in the route reply packet).

Thereafter, if the route reply packet reaches the fifth node E via a third node C and a fourth node D, a twisted path occurs. In this example, a difference between the predetermined number of hops from a destination node and the number of hops from a destination node indicated in the route reply packet can be greater than or equal to 2. Also, in this example, a sixth node G, and a seventh node F, do not participate in the path setting, because they are in-region nodes.

Referring to FIG. 4, S410, if the hop count in the route reply packet is greater by at least two hops than the predetermined hop count from the destination node, the controller, 620, of the wireless node can determine that a reactive path has occurred. Preferably, if the twisted path occurs as described in the exemplary embodiment shown in FIG. 8, the controller, 620, of the wireless node can generate a correction reply packet and transmit the correction reply packet to the node that transmitted the route reply packet, through the packet transmitter, 630 (S420).

Figure 5:
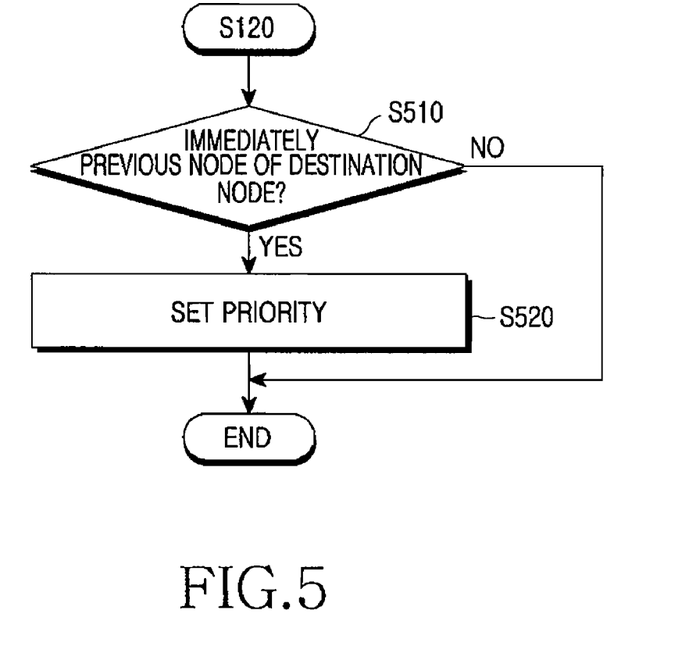
FIG. 5 is a flowchart illustrating a method for setting a multi-path according to an exemplary embodiment of the present invention.

FIG. 5 is a flowchart illustrating an operation of a method for setting a multi-path according to an exemplary embodiment of the present invention. The controller, 620, of the wireless node determines whether its own node is an immediately previous node of a destination node (S510). If its own node is not included in the insulating region (as shown in FIG. 8), the controller, 620, of the wireless node is allocated a higher priority from the destination node. On the other hand, if it's own node is included in the insulating region (as shown in FIG. 8), the controller, 620, can be allocated a lower priority from the destination node (S520). The priority can be set to a medium access priority allocated for reception of a packet from the destination node.

If its own node is a node on the primary path, the controller, 620, of the wireless node can be allocated the top priority among the higher priorities, from the destination node.

Figure 9:
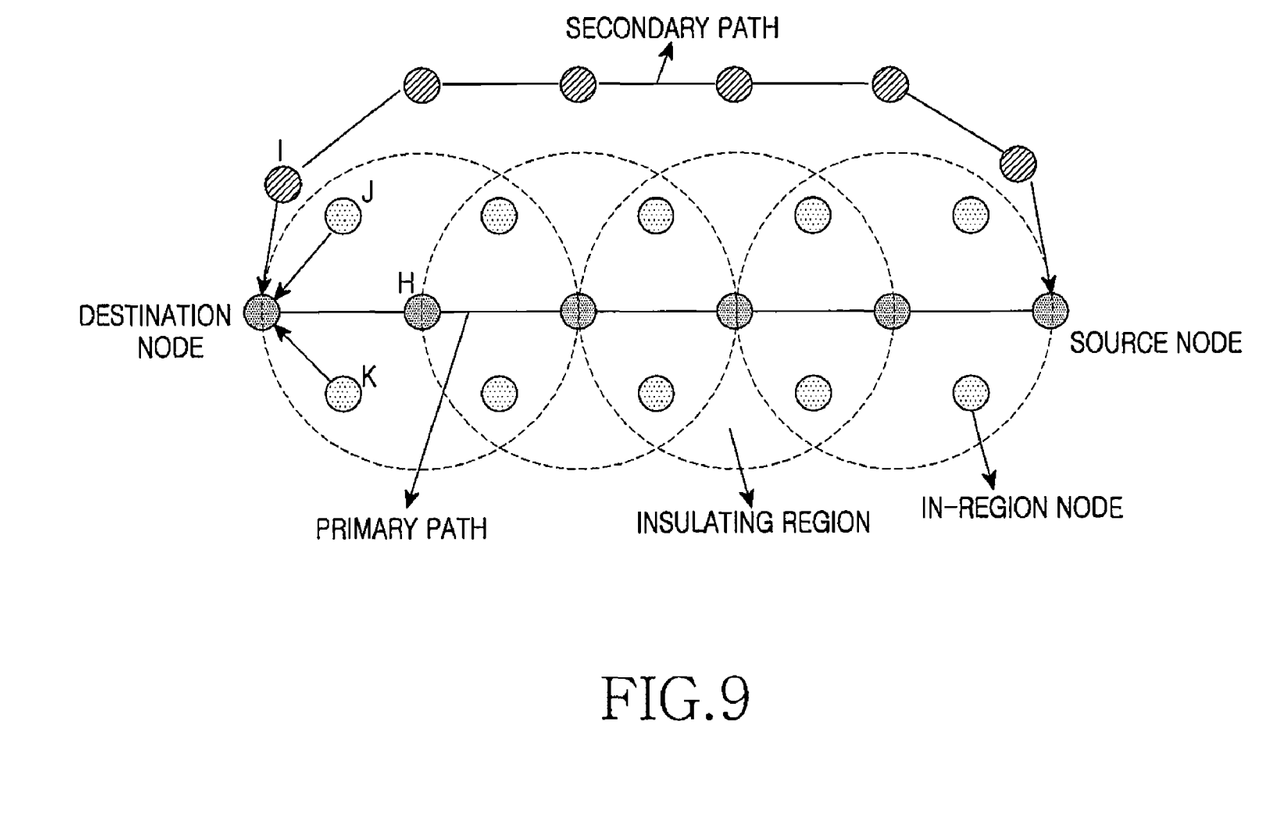
FIG. 9 is a diagram illustrating a method for priority allocation according to an exemplary embodiment of the present invention.

FIG. 9 shows a diagram illustrating a priority allocation process according to an exemplary embodiment of the present invention comprising a destination node may be able store a priority table. Specifically, the destination node, storing a medium access priority for each of 1-hop neighbor nodes, can preferably handle a higher-priority packet when it simultaneously receives several packets. For example, an eighth node H and a ninth node I are allocated higher priorities because they are not in-region nodes, while a tenth node J and an eleventh node K are allocated lower priorities because they are in-region nodes. That is, if the destination node receives packets simultaneously from the eighth node H and the eleventh node K, it preferably handles the packet from the eighth node H. Even though they may not be in the in-region nodes, it is preferable that the eighth node H which is a node in the primary path is handled with the higher priority than the ninth node I which is a node in a secondary path.

Referring to FIG. 6, in an exemplary embodiment, the packet receiver, 610, can receive a route reply packet including previous hop address information from a preceding node on the primary path. If the preceding node on the primary path is a destination node, a route reply packet can be received on a unicast basis, and if the preceding node on the primary path is not a destination node, the route reply packet can be received, preferably but not restrictively, on a broadcast basis. Preferably, the previous hop address information can be included, preferably but not restrictively, in the route reply packet. The controller, 620, can determine whether its own node is included in an insulating region based on previous hop address information in the route reply packet received through the packet receiver, 610, wherein, the insulating region can indicate the region where no path other than the primary path is established. The controller, 620, can determine whether a previous hop address included in the route reply packet received through the packet receiver, 610, is identical to its own node address. If the previous hop address included in the route reply packet is not identical to its own node address, it can set its own node as a node in the insulating region. However, if the previous hop address included in the route reply packet is identical to its own node address, the controller, 620, can recognize, its own node as a node that provides a path thereto. In addition, if the previous hop address included in the route reply packet is not identical to its own node address, the controller, 620, deletes information related to a node corresponding to the previous hop address from a path table. However, if the previous hop address included in the route reply packet is identical to its own node address, the controller, 620, recognizes its own node as a path providing node. Further, if the previous hop address included in the route reply packet is not identical to its own node address, the controller, 620, can preferably but not restrictively generate a Region protection (RPRT) packet and transmit the generated region protection packet through the packet transmitter, 630. Other nodes receiving the region protection packet can delete information on the node that transmitted the region protection packet, from the path table in the node from which they have received the region protection packet.

Moreover, if the controller, 620, determines that its own node is not included in the insulating region, the controller, 620, can determine whether a corresponding path is a reactive path depending on hop count information in the route reply packet. If the hop count in the route reply packet is greater by at least 2 hops than the predetermined hop count from a destination node, the controller, 620, determines that a reactive path has occurred. Accordingly, if the reactive path has occurred (for example, a. the twisted path), occurs, the controller, 620, can preferably generate a correction reply packet and transmit the correction reply packet to the node that transmitted the route reply packet, through the packet transmitter, 630. In addition, the controller, 620, determines whether its own node is an immediately previous node of a destination node depending on the information received from the destination node through the packet receiver, 610. If its own node is not included in the insulating region, the controller, 620, can preferably allocate a higher priority for its own node. However, if its own node is included in the insulating region, the controller, 620, can allocate a lower priority for its own node wherein, the priority can be a medium access priority allocated for reception of a packet from the destination node. Furthermore, if its own node is a node on the primary path, the controller, 620, can preferably but not restrictively set the top priority among the higher priorities, for its own node. The packet transmitter, 630, can preferably receive the route request packet, route reply packet, region protection packet and/or correction reply packet from the controller 620, and transmit the received packet(s).

The storage, 640, can preferably store the path table, provide the path table to the controller, 620, at the request of the controller, 620, and store the path table updated by the controller, 620.

Figure 7:
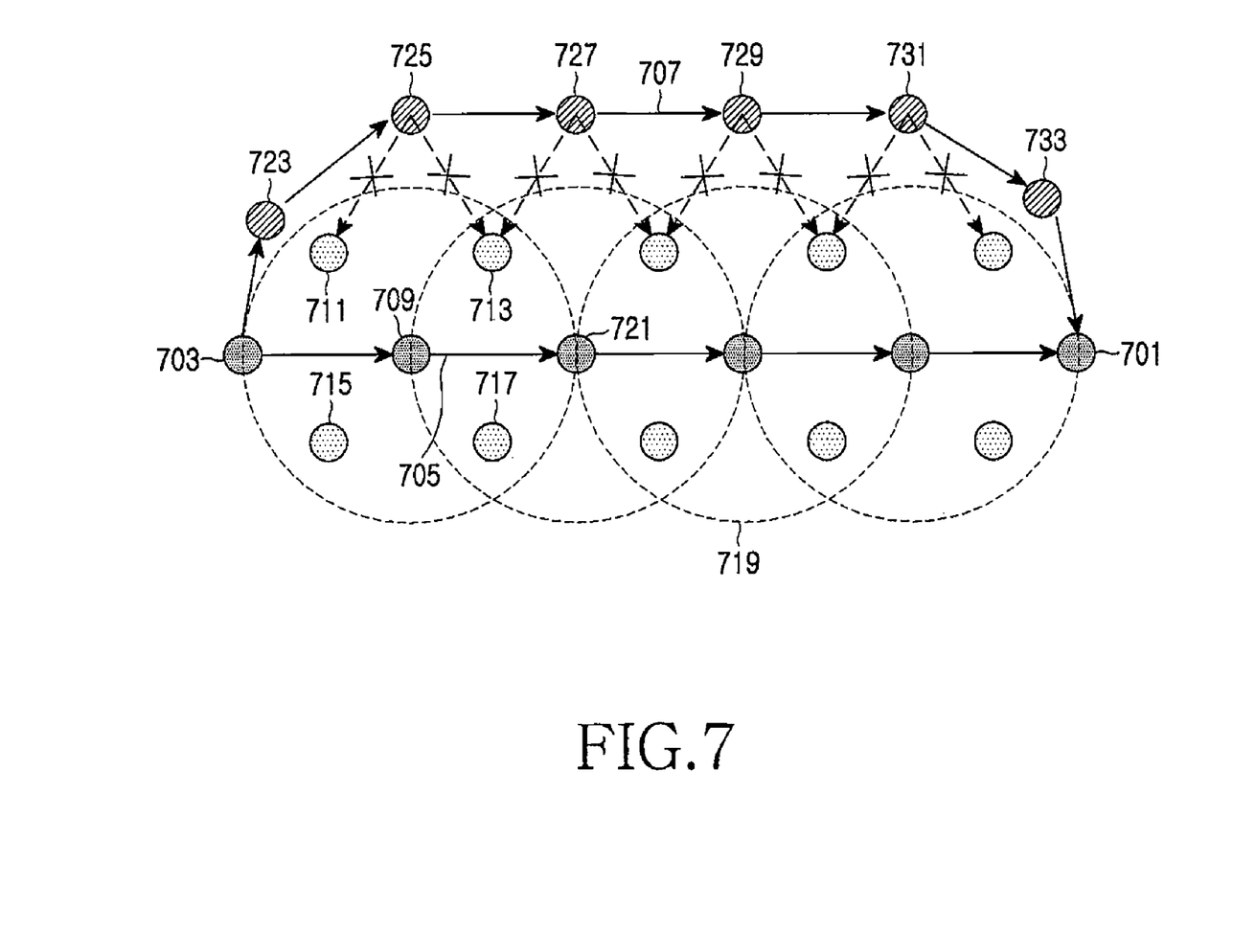
FIG. 7 is a diagram illustrating an apparatus and method for setting a multi-path according to an exemplary embodiment of the present invention.

FIG. 7 is a diagram illustrating an apparatus and method for setting a multi-path according to exemplary embodiments of the present invention. For example, if a primary path, 705, between a source node, 701, and a destination node, 703, is set, the destination node, 703, can transmit a route request packet for setting a secondary path, 707. In this case, the destination node, 703, transmits the route request packet for setting the secondary path, 707, preferably on a unicast basis. Thereafter, if a first next node, 709, of the destination node, 703, receives the route request packet for setting the secondary path, 707, the first next node, 709, is maintained as a node on the primary path, 705, because its own address is identical to a previous hop address in the route request packet. Thereafter, the first next node, 709, of the destination node, 703, transmits the route request packet for setting the secondary path, 707. In this case, the first next node, 709, transmits the route request packet for setting the secondary path, 707, preferably on a broadcast basis. Thereafter, if nodes, 711 to 717, in paths other than the primary path 705 among the neighbor nodes of the first next node, 709, receive the route request packet for setting the secondary path, 707, they are set as nodes in an insulating region, 719, because their own addresses are not identical to the previous hop address in the route request packet. If a node, 721, in the primary path, 705 among the neighbor nodes of the first next node, 709, receives the route request packet for setting the secondary path, 707, it is maintained as a node in the primary path, 705, because its own address is identical to the previous hop address in the route request packet. In this case, the nodes, 711 to 717, in paths other than the primary path, 705, among the neighbor nodes of the first next node, 709, generate a region protection packet and transmit the generated region protection packet to the neighbor nodes. Nodes, 723 and 725, receiving the region protection packet delete, from the path table, the nodes, 711 to 717, that transmitted the region protection packet. Thereafter, in the process of setting the secondary path, 707, the nodes, 723 to 733, in the secondary path, 707, prevent the nodes, 711 to 717, in the insulating region, 707, from participating in the secondary path, 707.

As can be understood from the foregoing description, an apparatus and method for setting a multi-path that can cancel and/or reduce interference between multiple paths taking the previous hop address into account in the ad-hoc networks, can prevent the setting of a reactive path during a multipath setting process and can efficiently transmit data based on priority.

The above-described exemplary embodiments of an apparatus and method for setting multi-paths may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The methods described herein may also be included in transmission media, for example, optical or metallic lines, wave guides, carrier waves that transmit signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

While the present invention has been shown and described with reference to particular illustrative embodiments, it is not to be restricted by the exemplary embodiments but only by the appended claims and their equivalent. It is to be appreciated that those skilled in the art can change or modify the exemplary embodiments without departing from and the scope and spirit of the present invention.

What is claimed is:

1. A method for setting multiple paths between nodes including a source node, a relay node, and a destination node that receives a message from the source node via the relay node, the method comprising:
   receiving, at a node, previous hop address information;
   determining whether the node that receives the previous hop address information is included in an insulating region, based on the previous hop address information; and
   if a previous hop address included in the previous hop address information is not the same as the node's address, setting the node as a wireless node in the insulating region,
   wherein the insulating region insulates a primary path between the source node and the destination node such that no other path is established in the insulating region.

2. The method of claim 1, wherein the setting comprises:
   deleting node information corresponding to the previous hop address from a path table, if the previous hop address is not identical to the node address; and
   transmitting a region protection packet,
   wherein the region protection packet is used for deleting information on a node that transmitted the region protection packet from a path table in a node that receives the region protection packet.

3. The method of claim 1, wherein the previous hop address information is included in a route reply packet.

4. The method of claim 3, further comprising:
   determining whether a reactive path occurs depending on hop count information in the route reply packet, if the node that receives the previous hop address information is not included in the insulating region; and
   transmitting a correction reply packet to a node that transmitted the route reply packet, if a reactive path occurs.

5. The method of claim 4, wherein the reactive path determination comprises:
   if the node that receives the previous hop address information is not included in the insulating region, determining that a reactive path has occurred if the hop count in the route reply packet is greater by at least two hops than a predetermined hop count from the destination node.

6. The method of claim 1, further comprising:
   if a corresponding node that receives the previous hop address information is an immediately previous node of the destination node, receiving a higher priority allocated from the destination node if it is determined that the corresponding node is not included in the insulating region, and receiving a lower priority allocated from the destination node if it is determined that the corresponding node is included in the insulating region; and
   wherein a packet is sent from the destination node to the source node through a minimum number of relay nodes, based on priority.

7. The method of claim 6, further comprising receiving a top priority among the higher priories from the destination node, if the corresponding node is a node in the primary path.

8. A multipath setting apparatus applied to a system including a source node, a relay node, and a destination node that receives a message from the source node via the relay node, the apparatus comprising:
   a receiver for receiving previous hop address information; and
   a controller for determining whether the multipath setting apparatus is included in an insulating region, based on the previous hop address information, and if a previous hop address included in the previous hop address information is not the same as the node's address, for setting the node as a wireless node in the insulating region,
   wherein the insulating region insulates a primary path between the source node and the destination node such that no other path is established in the insulating region.

9. The multipath setting apparatus of claim 8, further comprising:
   a storage for storing a path table; and
   a transmitter for transmitting a region protection packet received from the controller,
   wherein if the previous hop address is not identical to the node address, the controller deletes node information corresponding to the previous hop address from the path table and generates the region protection packet, and
   wherein the region protection packet is used for deleting information on a node that transmitted the region protection packet from a path table in a node that receives the region protection packet.

10. The multipath setting apparatus of claim 8, wherein the previous hop address information is included in a route reply packet.

11. The multipath setting apparatus of claim 10, wherein if the node of the multipath setting apparatus is not included in the insulating region, the controller determines whether a reactive path occurs depending on hop count information in the route reply packet and generates a correction reply packet if the reactive path occurs,
    wherein the transmitter transmits the correction reply packet received from the controller to a node that transmitted the route reply packet.

12. The multipath setting apparatus of claim 11, wherein if the node of the multipath setting apparatus is not included in the insulating region, the controller determines that a reactive path has occurred if the hop count in the route reply packet is greater by at least two hops than a predetermined hop count from the destination node.

13. The multipath setting apparatus of claim 8, wherein if the node of the multipath setting apparatus is an immediately previous node of the destination node, the controller, depending on information received from the destination node through the receiver, sets a higher priority for the node of the multipath setting apparatus if it is determined that the node of the multipath setting apparatus is not included in the insulating region, and sets a lower priority for the node of the multipath setting apparatus if it is determined that the node of the multipath setting apparatus is included in the insulating region, wherein a packet is sent from the destination node to the source node through a minimum number of relay nodes, based on priority.

14. The multipath setting apparatus of claim 13, wherein the controller sets a top priority among the higher priorities, for the node of the multipath setting apparatus, if the node of the multipath setting apparatus is a node in the primary path.

15. A non transitory computer-readable recording medium storing a program comprising:

a first set of instructions for receiving, at a node, previous hop address information; and a second set of instructions for determining whether the node that receives the previous hop address information is included in an insulating region, based on the previous hop address information, and if a previous hop address included in the previous hop address information is not the same as the node's address, for setting the node as a wireless node in the insulating region, wherein the insulating region insulates a primary path between the source node and the destination node such that no other path is established in the insulating region.

16. A computer implemented method for setting a multipath between wireless nodes comprising:

receiving a message from a source node via a relay node;

receiving, at a node, a hop address of a previous node;

determining whether the node that receives the previous hop address information is included in an insulating region, based on the previous hop address information; and if a previous hop address included in the previous hop address information is not the same as the node's address, setting the node as a wireless node in the insulating region, wherein the insulating region insulates a primary path between the source node and the destination node such that no other path is established in the insulating region.

* * * * *